US008831520B2

(12) United States Patent
Demessie et al.

(10) Patent No.: US 8,831,520 B2
(45) Date of Patent: Sep. 9, 2014

(54) INFORMATION SHARING METHOD IN COGNITIVE RADIO COMMUNICATION, COGNITIVE RADIO COMMUNICATION DEVICE, AND COGNITIVE RADIO COMMUNICATION SYSTEM

(75) Inventors: Yohannes Alemseged Demessie, Tokyo (JP); Ha Nguyen Tran, Tokyo (JP); Chen Sun, Tokyo (JP); Hiroshi Harada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 321 days.

(21) Appl. No.: 13/383,982

(22) PCT Filed: Jul. 12, 2010

(86) PCT No.: PCT/JP2010/004501
§ 371 (c)(1),
(2), (4) Date: Feb. 15, 2012

(87) PCT Pub. No.: WO2011/007539
PCT Pub. Date: Jan. 20, 2011

(65) Prior Publication Data
US 2012/0135772 A1 May 31, 2012

(30) Foreign Application Priority Data
Jul. 13, 2009 (JP) .................................. 2009-165167

(51) Int. Cl.
*H04B 15/00* (2006.01)
*H04B 17/00* (2006.01)
*H04W 16/14* (2009.01)
(52) U.S. Cl.
CPC .................................... *H04W 16/14* (2013.01)
USPC ....... 455/62; 455/161.1; 455/164.1; 370/328; 370/329

(58) Field of Classification Search
CPC ................................................. H04W 72/0406
USPC .......... 455/62, 161.1, 164.1, 179.1, 434, 450, 455/452.2, 511; 370/328, 329
See application file for complete search history.

(56) References Cited

U.S. PATENT DOCUMENTS

| 7,917,110 B2* | 3/2011 | Horiguchi et al. ......... 455/164.1 |
| 2007/0253394 A1 | 11/2007 | Horiguchi et al. |
| 2008/0261639 A1* | 10/2008 | Sun et al. ...................... 455/515 |

FOREIGN PATENT DOCUMENTS

| CN | 101064861 A | 10/2007 |
| JP | 2007-088940 | 4/2007 |

(Continued)

OTHER PUBLICATIONS

Yau A.K.-L, Komisarczuk P. , Teal, P. D., "On Multi-Channel MAC Protocols in Cognitive Radio Networks" , Telecommunication Networks and Applications Conference, 2008. ATNAC 2008. Australasian, 2008.12, pp. 300-305.

(Continued)

Primary Examiner — Tuan H Nguyen
(74) Attorney, Agent, or Firm — Myers Wolin, LLC (57) ABSTRACT

In a cognitive radio communication device, before a communication link for the cognitive radio communication is established, a control channel which is a common channel which can be used by a plurality of cognitive radio communication devices is detected. By exchanging sensing information and sensing control information among the plurality of radio communication devices using the detected common channel, the information is shared. The plurality of cognitive radio communication devices share the sensing information and the sensing control information, and use the information for determining a channel used for spectrum monitoring and data communication, and the like.

10 Claims, 5 Drawing Sheets

(56) References Cited

FOREIGN PATENT DOCUMENTS

| JP | 2007088940 | 4/2007 |
|----|------------|--------|
| JP | 2007-166488 | 6/2007 |
| JP | 2008079280 | 4/2008 |
| WO | 2008068711 A1 | 6/2008 |
| WO | 2009/044292 | 4/2009 |

OTHER PUBLICATIONS

Xiaoyu Wang, Pin-Han Ho, Wong, A., "Towards Efficient Spectrum Sensing for Cognitive Radio through Knowledge-Based Reasoning", New Frontiers in Dynamic Spectrum Access Networks, 2008. DySPAN 2008. 3rd IEEE Symposium, 2008. 12, pp. 1-8.

Feng Gao, Wei Yuan, Wei Liu, Wenqing Cheng, Shu Wang, "Pipelined Cooperative Spectrum Sensing in Cognitive Radio Networks", Wireless Communications and Networking Conference, 2009. WCNC 2009. IEEE, 2009.04, pp. 1-5.

English translations of the International Search Report mailed Oct. 12, 2010, and International Preliminary Report on Patentability completed Oct. 5, 2011, for corresponding International Application No. PCT/JP2010/004501 mailed Oct. 12, 2010.

Office Action from Japan Patent Office for corresponding Japanese application 2009-165167 issued Feb. 12, 2014.

Office Action for corresponding Chinese Patent Application No. 201080031612.7, issued Mar. 4, 2014.

* cited by examiner

INFORMATION SHARING METHOD IN COGNITIVE RADIO COMMUNICATION, COGNITIVE RADIO COMMUNICATION DEVICE, AND COGNITIVE RADIO COMMUNICATION SYSTEM

CROSS REFERENCE TO RELATED APPLICATIONS

The present disclosure is a national phase filing under 35 U.S.C. §371 of International Patent Application No. PCT/JP2010/004501 filed on Jul. 12, 2010, which claims priority to Japanese Patent Application No. 2009-165167 filed on Jul. 13, 2009, the disclosures of each of which are expressly incorporated herein by reference in their entireties.

TECHNICAL FIELD

The present invention relates to an information sharing method in cognitive radio communication, a cognitive radio communication device, and a cognitive radio communication system. In particular, the present invention relates to an information sharing method that causes sensing information and sensing control information to be shared by a plurality of cognitive radio communication devices before cognitive radio communication is established, and a cognitive radio communication device and a cognitive radio communication system that can cause the information to be shared using the information sharing method.

BACKGROUND ART

Radio communication is performed among a plurality of radio communication devices. A frequency band is allocated to each radio communication service to perform the radio communication. However, at the present time, the number of radio communication services increases. As a result, it becomes difficult to allocate a different frequency band to a new radio communication service or a new radio communication application. That is, the radio communication services are in a saturation state.

As such, although the radio communication services are in a saturation state currently, it is known that there are frequency bands that are rarely used. This shows that a radio spectrum is not efficiently used.

Therefore, in order to promote efficient use of the radio spectrum, Federal Communication Commission (FCC) released a paper that proposed to allow an unlicensed radio communication service to have access to a non-used frequency band in 2002. The paper is prepared by Spectrum Policy Task Force (SPTF). An example of the radio communication that is improved according to this scenario is cognitive radio communication (for example, refer to Patent Document 1).

In a cognitive radio communication system, a process for establishing data communication (communication link) is executed. Specifically, first, spectrum sensing is performed over a special radio frequency range. Subsequently, a spectrum use situation is analyzed on the basis of the result of the spectrum sensing. Information is exchanged among components (nodes) constituting the cognitive radio communication system. The exchanged information includes sensing information and sensing control information. In this case, the nodes can perform sensing to generate sensing information or can acquire the sensing information from the other nodes. In this way, each node shares the sensing information with the other nodes. Accordingly, a sensing quality is improved.

Then, in the cognitive radio communication system, a frequency band that is used for data communication is determined. Accordingly, the data communication can be performed.

However, each node of the cognitive radio communication system may not grasp a channel to be used for data communication, until the sensing is performed. Therefore, each node may not grasp a channel that is used to share the sensing information or the sensing control information.

PRIOR ART DOCUMENTS

Patent Documents
Patent Document 1: Japanese Patent Application Laid-Open No. 2007-088940

SUMMARY OF INVENTION

Technical Problem

Accordingly, an object of the present invention is to provide an information sharing method in cognitive radio communication that can efficiently and effectively exchange sensing information and sensing control information among a plurality of cognitive radio communication devices. Another object of the present invention is to provide a cognitive radio communication device that can share the sensing information and the sensing control information using the information sharing method and a cognitive radio communication system.

Solution to Problem

A first aspect of the present invention relates to an information sharing method in cognitive radio communication. In the information sharing method, a detecting step and an information sharing step are executed. The detecting step is a step that is executed before a communication link for the cognitive radio communication is established (for example, during a sensing period). In the detecting step, a common channel that can be used among a plurality of radio communication devices is detected. In the information sharing step, sensing information and sensing control information are shared by the plurality of radio communication devices, using the common channel. As such, by using the sharing channel, the sensing information or the sensing control information can be efficiently and effectively exchanged. The radio communication device may be a part of a device that can perform the radio communication or the device itself. The plurality of radio communication devices may include a data archive (DA). In the data archive (DA), the sensing information or the sensing control information is stored. The data archive (DA) can transmit the sensing information to another radio communication device (for example, cognitive engine (CE)) or transmit the sensing control information to another radio communication device (for example, spectrum sensor).

In another aspect of the present invention, the plurality of radio communication devices include a spectrum sensor. The spectrum sensor performs spectrum sensing before the communication link is established. In this case, the information sharing method further includes a sensing step. In the sensing step, the spectrum sensing is performed by the spectrum sensor. Thereby, the sensing information is obtained. In the information sharing step, the spectrum sensor transmits the sensing information obtained by the sensing step to the other radio communication devices using the common channel. Thereby, the sensing information is shared by the plurality of radio communication devices.

In another aspect of the present invention, the plurality of radio communication devices include a cognitive engine or a data archive. In this case, the cognitive engine generates the sensing control information to control sensing by the spectrum sensor. The data archive stores the sensing control information generated by the cognitive engine and the sensing information acquired by the spectrum sensor and provides the sensing control information and the sensing information to the other radio communication devices. In this case, in the sensing step, the spectrum sensor performs the spectrum sensing, according to the sensing control information acquired through the common channel. As such, the sensing control information is also shared and an effective process can be executed. The cognitive engine (CE) or the data archive (DA) is configured to store the sensing information acquired by the spectrum sensor. That is, the cognitive engine (CE) or the data archive (DA) is an example of a device that functions as a client of the spectrum sensor.

In another aspect of the present invention, the plurality of radio communication devices include a data archive that stores information and a cognitive engine that reads the information stored in the data archive. In this case, in the information sharing step, the spectrum sensor transmits the sensing information obtained by the sensing step to the data archive using the common channel to store the sensing information in the data archive. Thereby, the cognitive engine can monitor the sensing information that is stored in the data archive.

In another aspect of the present invention, in the detecting step, the common channel is detected from a frequency slot of an ISM band. The ISM band is a frequency band that is suitable for the cognitive radio communication. According to this aspect, since the ISM band is used before the communication link is established, the ISM band can be efficiently used.

A second aspect of the present invention relates to a cognitive radio communication device that can cause information to be shared using the information sharing method. Specifically, the cognitive radio communication device is a device that can cause information to be shared by the other radio communication devices, using a channel detected before a communication link for cognitive radio communication is established. A third aspect of the present invention relates to a cognitive radio communication system that includes a plurality of cognitive radio communication devices according to the second aspect. The same effect as that of the first aspect can be achieved by the second and third aspects.

Advantageous Effects of invention

According to the present invention, information can be efficiently and effectively exchanged among a plurality of cognitive radio communication devices. According to the present invention, since a non-used spectrum called a white space is found out and is used in data communication, this is effective in particular when sensing information and sensing control information are exchanged between different media (for example, a sensor and a client of the sensor). An example of the sensing control information is disclosed in a pamphlet of WO2008-086243.

DESCRIPTION OF EMBODIMENTS

Hereinafter, an embodiment to carry out the present invention will be described using the drawings. However, the embodiment to be described below is exemplary and can be appropriately changed in a range that is apparent to those skilled in the art.

Figure 1:
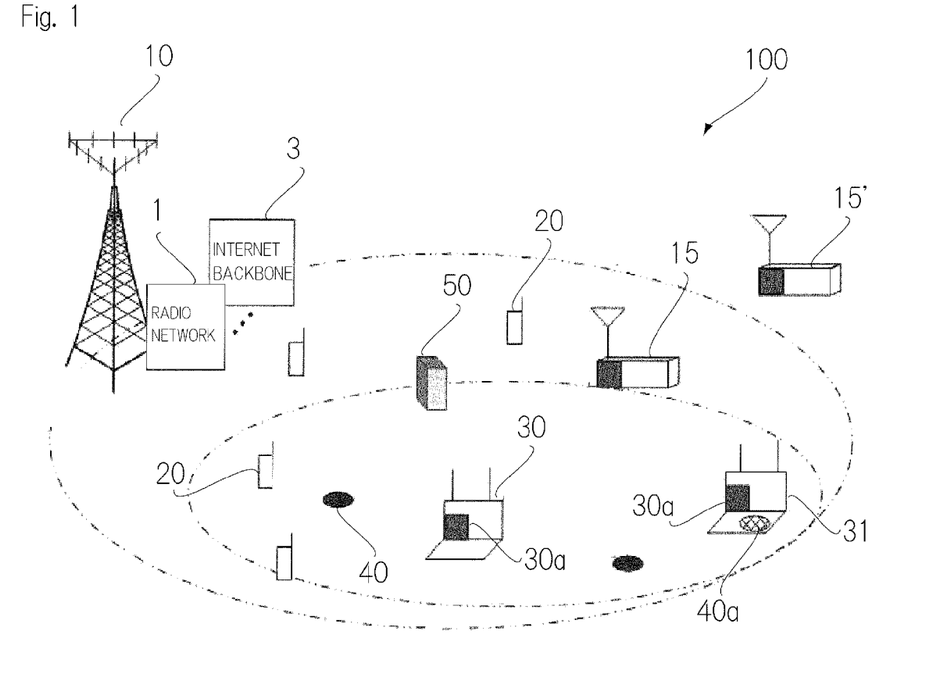
FIG. 1 is a schematic diagram illustrating a structure of a cognitive radio communication system according to the present invention.

FIG. 1 is a schematic diagram illustrating a structure of a cognitive radio communication system according to the present invention.

A cognitive radio communication system 100 illustrated in FIG. 1 includes a plurality of radio communication devices. In the cognitive radio communication system 100, data communication based on cognitive radio communication is performed among the plurality of radio communication devices.

Specifically, as illustrated in FIG. 1, the cognitive radio communication system 100 includes a base station 10 for a primary system, a base station 15 for a secondary system, a radio communication device 20 functioning as a primary user, radio communication devices 30 and 31 functioning as secondary users, a spectrum sensor 40, and a data archive 50 as components. The data archive 40 and the spectrum sensor 50 function as the radio communication devices.

The components of the cognitive radio communication system 100 are configured to perform radio communication with each other. Thereby, a radio network 1 is formed. In other words, the components of the cognitive radio communication system 100 are connected to the radio network 1. The cognitive radio communication system 100 includes an Internet backbone 3. Thereby, the components are connected to the Internet through the radio network 1. An example of the Internet backbone 3 is a public switched telephone network (PSTN).

In FIG. 1, a base station 15' for a secondary system of another radio commutation system is also illustrated. The base station 15' is disposed outside a range of an area where radio communication through the radio network 1 in the radio communication system 100 can be performed (communication enabled range). The base station 15' can perform communication with the radio communication device (for example, base station 15) in the communication enabled range of the radio communication system 100 and functions as the secondary user. Therefore, the secondary user is also an example of the component of the cognitive radio communication device 100.

The base station 10 for the primary system and the base station 15 for the secondary system are connected to each other by wire or wireless and can transmit and receive information. The base station 15 for the secondary system is mounted with a cognitive engine (CE) 15a. In this case, the cognitive engine (CE) 15a is a control device that performs the cognitive radio communication with another radio communication device, and direct radio communication using the radio network 1 can be performed between the base station 10 and the cognitive engine 15a. When a pair of radio communication devices performs the cognitive radio communication, the cognitive engine (CE) 15a specifies a frequency band to be used by the pair of radio communication devices and transmits a control signal to the pair of radio communication devices to perform the radio communication using the specified frequency band.

The radio communication device 20 can transmit and receive data through the radio network 1 or the Internet backbone 3, between the base stations 10 and 15.

Similar to the radio communication device 20, the radio communication devices 30 and 31 can transmit and receive data through the radio network 1 or the Internet backbone 3, between the base stations 10 and 15.

The radio communication devices 30 and 31 are radio communication devices that are mounted with a cognitive engine (CE) 30a. In this case, the cognitive engine (CE) 30a has the same function as that of the cognitive engine (CE) 15a.

The radio communication device 20 and the radio communication devices 30 and 31 are operated according to a control signal from the radio communication device mounted with the cognitive engine, and can perform direct communication (P2P communication) with each other. In this case, since the radio communication device 30 or the radio communication device 31 includes the cognitive engine 30a, the radio communication device 30 or the radio communication device 31 can perform the P2P communication with the other radio communication devices, using the cognitive engine 30a.

The radio communication device 31 is mounted with a spectrum sensor 40a. The spectrum sensor 40a has the same function as that of the spectrum sensor 40. The radio communication device 30 is not mounted with the spectrum sensor 40a.

The spectrum sensor 40 is a device to perform spectrum sensing and is a sensor of a stand-alone type disposed to be distributed in the radio network 1. The spectrum sensor 40a is different from the spectrum sensor 40 in using a type not to be the stand-alone type. In this case, the spectrum sensing means sensing that is performed to promote the use opportunity of the spectrum effectively.

The data archive 50 stores information systematically (for example, with information related to time) and functions as a recording unit, a data source, or a database in the radio communication system 100. For example, in the data archive 50, sensing information transmitted from a plurality of spectrum sensors to be spatially distributed is stored. The large difference of the data archive 50 and the cognitive engine (CE) is that the data archive 50 does not perform determination related to use of the spectrum.

In this case, the sensing information (past sensing information) stored in the data archive 50 is read by another radio communication device (for example, cognitive engine (CE)), and is used for monitoring the spectrum. The information stored in the data archive 50 is not limited to the sensing information and may be other information, for example, sensing control information. Since the data archive 50 stores the past sensing information and the past sensing control information, complete information can be quickly provided to the cognitive engine (CE). The type of the data archive 50 is the stand-alone type in the example illustrated in FIG. 1. However, the data archive 50 may be incorporated in the base stations 10 and 15 or the radio communication devices 20, 30, and 31.

Figure 2:
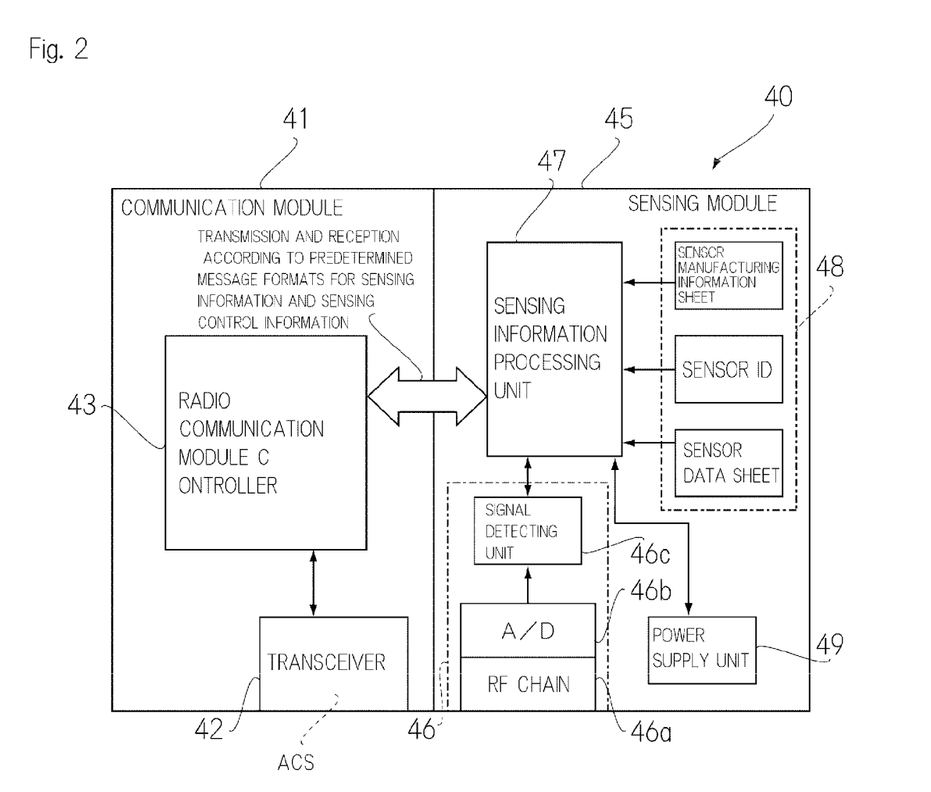
FIG. 2 is a block diagram illustrating a structure of a spectrum sensor in FIG. 1.

FIG. 2 is a block diagram illustrating a structure of the spectrum sensor 40 in FIG. 1. The spectrum sensor 40a has the same structure as that of the spectrum sensor 40.

As illustrated in FIG. 2, the spectrum sensor 40 includes a communication module 41 and a sensing module 45. The communication module 41 and the sensing module 45 are configured to be operated in cooperation with each other.

The communication module 41 includes a transceiver 42 and a radio communication module controller 43. The transceiver 42 transmits the sensing information using an auxiliary control channel for sensing (ACS) to be described below or receives the sensing control information using the auxiliary control channel for sensing (ACS). The auxiliary control channel for sensing (ACS) is an example of a common channel between the spectrum sensor 40 and the client. The radio communication module controller 43 performs various control operations in the communication module 41. For example, the radio communication module controller 43 exchanges information with the sensing module 45 or handles information transmitted and received by the transceiver 42.

The sensing module 45 includes a detector 46, a sensing information processing unit 47, a memory 48, and a power supply unit 49. The detector 46 receives a radio signal. Specifically, the detector 46 includes an RF chain 46a, an analog/digital converter (A/D converter) 46b, and a signal detecting unit 46c. In the memory 48, information related to the spectrum sensor 40 is stored. For example, in the memory 48, a sensor manufacturing information sheet, a sensor ID, and a sensor data sheet are stored. The power supply unit 49 supplies power that is needed to operate the sensing module 45.

If the radio signal is received to the sensing module 45 through the RF chain 46a, the received radio signal is converted into a digital signal by the A/D converter 46b and the signal detecting unit 46c detects a needed signal from the digital signal. The detected signal is input as the sensing information to the sensing information processing unit 47. The sensing information processing unit 47 reads information related to the spectrum sensor 40 from the memory 48 or processes the sensing information input from the signal detecting unit 46c, according to necessity. The sensing information processing unit 47 exchanges information with the radio communication module controller 43.

Figure 3:
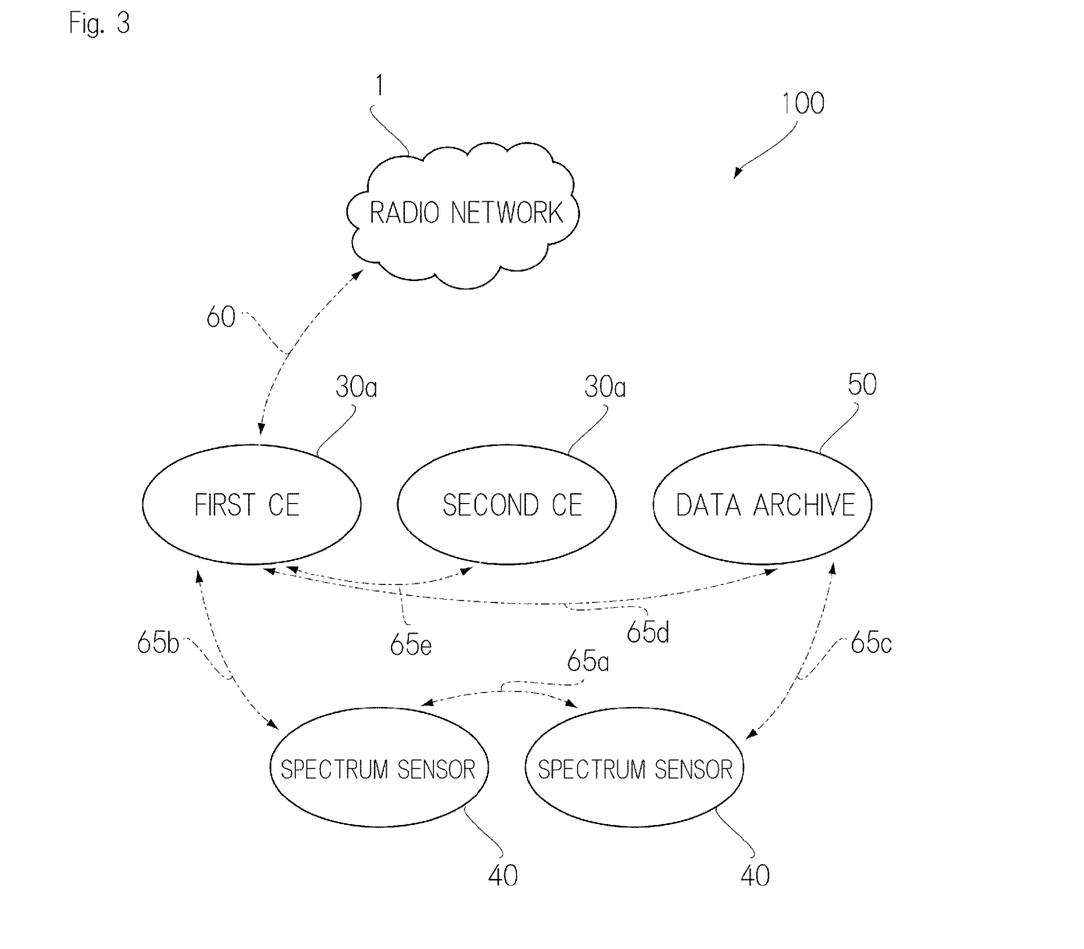
FIG. 3 is a schematic diagram illustrating a relation of a plurality of components constituting the radio communication system of FIG. 1.

FIG. 3 is a schematic diagram illustrating a relation of a plurality of components constituting the radio communication system 100 of FIG. 1.

FIG. 3 illustrates the partial components among the plurality of components constituting the cognitive radio communication system 100 of FIG. 1. Specifically, the radio network 1, a first cognitive engine (CE), a second cognitive engine (CE), the data archive 50, a first spectrum sensor, and a second spectrum sensor are illustrated in FIG. 2.

In this case, the first cognitive engine (CE) corresponds to the cognitive engine (CE) 30a that is mounted in the radio communication device 30. The second cognitive engine (CE) corresponds to the cognitive engine (CE) 15a that is mounted in the base station 15. The first connive engine (CE) or the second cognitive engine (CE) may correspond to the cognitive engine (CE) 30a that is mounted in the radio communication device 31.

In addition, the first spectrum sensor, for example, corresponds to the spectrum sensor 40 of the stand-alone type. The second spectrum sensor, for example, corresponds to the spectrum sensor 40a that is mounted in the radio communication device 31. The second spectrum sensor may be a spectrum sensor that is different from the first spectrum sensor.

The components are formed to be connected to each other, that is, to form a channel as illustrated in FIG. 3. The formed channel is used when an information exchanging process of FIG. 5 to be described below is executed.

In this case, various kinds of channels that are formed during a sensing period will be described. The number of kinds of the channels is greatly two. Specifically, one channel is a channel that can be formed in the related art, and is a channel 60 that is formed between the radio network 1 and the first cognitive engine (CE) or the second cognitive engine (CE), as illustrated in FIG. 3. An example of the channel 60 is a cognitive pilot channel (CPC). The cognitive pilot channel (CPC), for example, is a channel used to notify a primary user at a predetermined section (cell region) of spectrum use association information.

The other channel is a channel formed among the components. The channel is formed during the sensing period, and is used mainly during the sensing period. For this reason, in the specification, the other channel is called an auxiliary control channel for sensing (ACS).

As illustrated in FIG. 3, the number of kinds of the auxiliary control channel for sensing (ACS) is five (refer to reference numerals 65a to 65e). The auxiliary control channel for sensing (ACS) 65a is a channel formed between a pair of spectrum sensors during the sensing period. The auxiliary control channel for sensing (ACS) 65b is a channel formed between the cognitive engine (CE) and the spectrum sensor during the sensing period. The auxiliary control channel for sensing (ACS) 65c is a channel formed between the data archive 50 and the spectrum sensor during the sensing period. The auxiliary control channel for sensing (ACS) 65d is a channel formed between the cognitive engine (CE) and the data archive 50 during the sensing period. The auxiliary control channel for sensing (ACS) 65e is a channel formed between the pair of cognitive engines (CE) during the sensing period.

Figure 4:
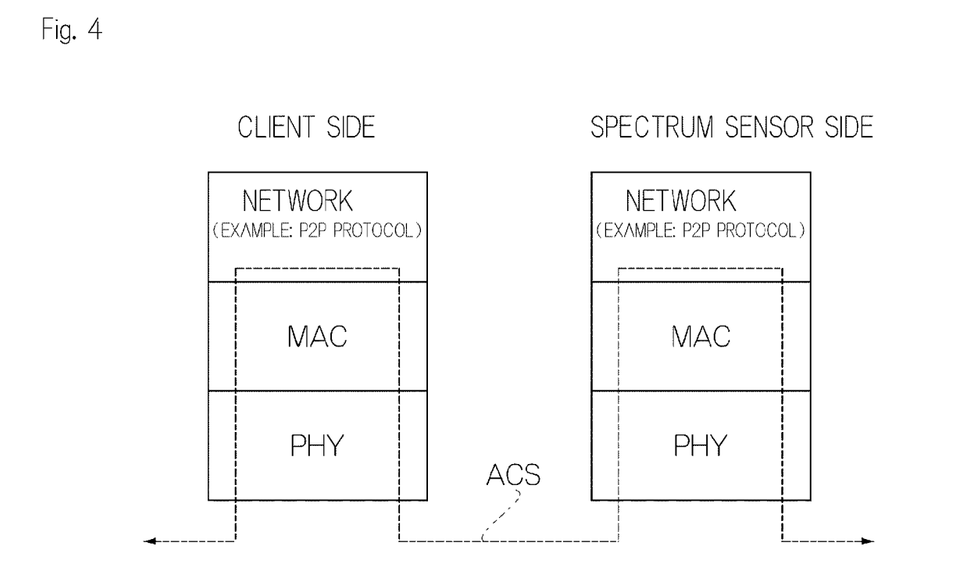
FIG. 4 is a diagram illustrating an ISO model of a spectrum sensor and a client thereof.

FIG. 4 is a diagram illustrating an ISO model of the spectrum sensor 40 and a client thereof. An example illustrated in FIG. 4 can be applied to the spectrum sensor 40a as well as the spectrum sensor 40.

As illustrated in FIG. 4, the spectrum sensor 40 and the client thereof can perform communication with each other through the auxiliary control channel for the sensing (ACS). The spectrum sensor 40 and the client have a PHY layer and a MAC layer in the ISO model. In this case, another spectrum sensor, the cognitive engine (CE), or the data archive 50 is considered as the client, as can be seen from FIG. 3. The auxiliary control channel for sensing (ACS) is configured to correspond to the PHY layer and the MAC layer of the ISO model, in the example illustrated in FIG. 4.

The spectrum sensor 40 and the client thereof use the auxiliary control channel for sensing (ACS) as the common channel, a network is formed during the sensing period, and information can be exchanged between the spectrum sensor 40 and the client. Thereby, the P2P communication can be performed between the spectrum sensor 40 and the client thereof, during the sensing period. As a mounting example of the spectrum sensor or the client, the ISO model is illustrated in FIG. 4. However, the mounting example is not limited to the ISO model.

In this way, during the sensing period, the channel can be formed between the pair of radio communication devices positioned at the short distance, and information can be quickly exchanged using the channel in actuality. Since the pair of radio communication devices are positioned at the short distance, a loss of energy that is needed to exchange the information can be decreased. Therefore, the information can be exchanged efficiently with high robustness. That is, according to the aspect, the sensing information and the sensing control information can be efficiently and effectively exchanged.

Next, the auxiliary control channel for sensing (ACS) will be described in detail.

A frequency band that is allocated to the auxiliary control channel for sensing (ACS) is set to be previously known by a terminal device in communication (for example, the cognitive engine (CE), the spectrum sensor, or the data archive).

For example, in the case where the auxiliary control channel for sensing (ACS) is formed at the short distance (for example, several meters to several hundred meters), when the spectrum sensors 40 and 40a perform sensing, a frequency band of the auxiliary control channel for sensing (ACS) is set in consideration of a predetermined frequency slot (radio channel) in an industry-science-medical band (ISM band). For example, the frequency band of the auxiliary control channel for sensing (ACS) is set to a frequency slot selected from a 2.4 GHz band (2.4 to 2.5 GHz) or a 5.8 GHz band (5.725 to 5.875 GHz).

The frequency band of the auxiliary control channel for sensing (ACS) may be set in consideration of an existing radio technology (radio communication service), instead of the frequency slot. In this case, a frequency band that corresponds to a physical layer for a ultra wide band (UWB PHY) at the standard of a low rate wireless personal area network (LR-WPAN), Zigbee (registered trademark), Bluetooth (registered trademark), IEEE 802.11, or infrared communication (IrDA) becomes a candidate of the auxiliary control channel for the sensing (ACS). When a plurality of candidates exist, one candidate selected using a predetermined method may be allocated to each auxiliary control channel for sensing (ACS), or the plurality of candidates may be allocated to each auxiliary control channel for sensing (ACS) to be replaced. In an existing technology such as the LR-WPAN, the Zigbee, or the Bluetooth (registered trademark), short-distance low data rate radio communication can be performed.

The frequency band of the auxiliary control channel for sensing (ACS) may be set in consideration of both the frequency slot and the existing radio technology.

The width of the frequency band allocated to the auxiliary control channel for sensing (ACS) may be narrow. For example, the width of the frequency band allocated to the auxiliary control channel for sensing (ACS) is set to be narrower than the width of the frequency band allocated to the radio communication service. This is because limited information such as the sensing information and the sensing control information may be exchanged among the components, in the auxiliary control channel for the sensing (ACS). Since the information to be exchanged is limited, a data rate can be set low (for example, several hundreds kb/s) at a communication link using the auxiliary control channel for sensing (ACS).

The auxiliary control channel for sensing (ACS) supports bidirectional data communication (information flow) among the components to realize an information exchange among the components. Thereby, the radio communication device that is the client can transmit a control signal to optimize spectrum sensing activity to the spectrum sensor. The spectrum sensor can be controlled to perform the spectrum sensing at a special frequency band. The spectrum sensor can be controlled to perform signal detection at a specific error alarm rate. The spectrum sensor can transmit corresponding information to the radio communication device, according to a control message or a control command included in the received control signal.

Figure 5:
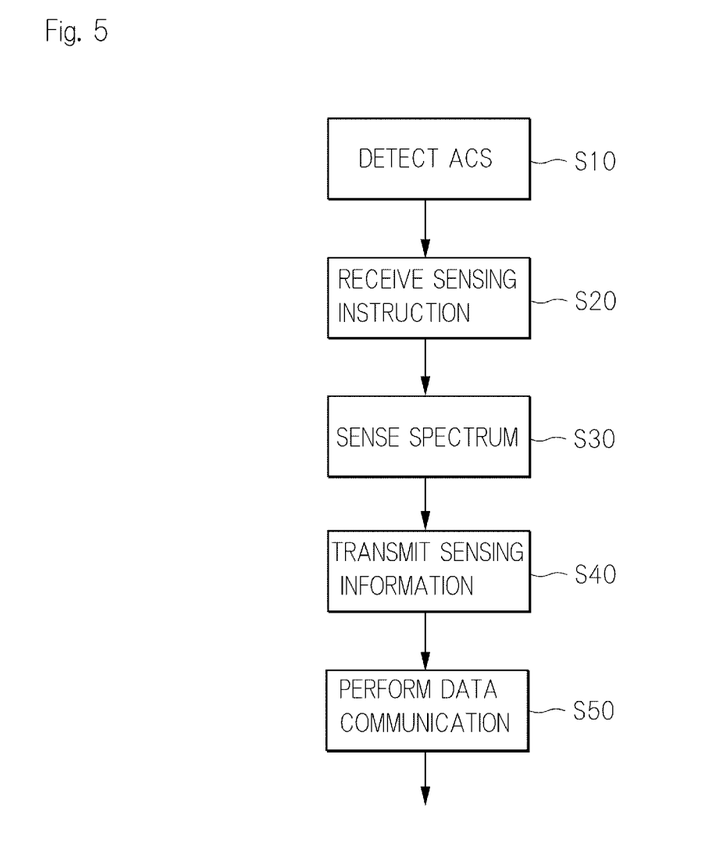
FIG. 5 is a flowchart illustrating a process sequence of a communication method that is executed by the radio communication system of FIG. 1.

FIG. 5 is a flowchart illustrating a process sequence of a communication method that is executed by the radio communication system 100 of FIG. 1. For example, in the specification, a process sequence of a communication method that is executed between the spectrum sensor 40 and the client thereof will be described as an example.

In FIG. 5, first, spectrum sensing is performed during a sensing period of steps S10 to S40. Specifically, in step S10, the spectrum sensor 40 detects the auxiliary control channel for sensing (ACS).

Then, in steps S20 to S40, information is exchanged among the plurality of radio communication devices using the auxiliary control channel for sensing (ACS). In this case, the exchanged information includes sensing information obtained by the spectrum sensing and sensing control information to control the sensing. The sensing control information is generated by the cognitive engine (CE) and is generated on the basis of the sensing information. The sensing control information includes information related to the frequency band to perform the sensing. By exchanging the information, the information is shared by the plurality of radio communication devices.

First, in step S20, the spectrum sensor 40 receives a sensing instruction (sensing control information) from the client through the auxiliary control channel for sensing (ACS) (step S20).

Next, in step S30, the spectrum sensor 40 executes the spectrum sensing according to the received instruction. The spectrum sensor 40 transmits the sensing information obtained by performing the spectrum sensing to the client (for example, the cognitive engine (CE)) through the auxiliary control channel for sensing (ACS).

Also, a series of processes of steps S10 to S40 is executed in the other spectrum sensors. The radio communication device (for example, data archive (DA)) that does not perform the spectrum sensing receives information, that is, the sensing information or the sensing control information from the other radio communication devices through the auxiliary control channel for sensing (ACS) through the series of processes of steps S10 to S40 described above. In this way, the information is exchanged among the components of the radio communication system 100. As a result, each component shares the same information with the other components.

As the result of the information exchange, the sensing information is collected in the cognitive engine (CE). The cognitive engine (CE) determines the pair of radio communication devices to perform the data communication or the frequency band to perform the data communication by the pair of radio communication devices, on the basis of the collected sensing information. Specifically, the cognitive engine (CE) determines the frequency band when the non-used spectrum (white space) is found, based on the analysis result of the use situation of the spectrum. The information related to the determined frequency band is also transmitted to the corresponding pair of radio communication devices through the auxiliary control channel for sensing (ACS).

Then, in step S50, the pair of radio communication devices to perform the radio communication establish (set up) the communication link according to the sensing control information and perform the data communication (for example, P2P communication) based on the cognitive radio communication with each other. The frequency band that is used in the data communication is determined by the cognitive engine (CE). The data communication may be performed using the auxiliary control channel for sensing (ACS). However, the data communication is preferably performed using a dedicated channel for data communication.

Next, specific examples (first to third specific examples) of the present invention will be described.

In the first specific example, the spectrum sensors 40 and 40a are configured to perform cooperative sensing/collaborative sensing. In this case, the cooperative sensing is sensing that is performed among the radio communication devices mounted with the spectrum sensor 40a and the collaborative sensing is sensing that is performed among the spectrum sensors 40 of the stand-alone type. The spectrum sensor 40 or the spectrum sensor 40a performs the spectrum sensing according to a request (instruction) from the cognitive engine (CE) and transmits the sensing result as the sensing information to the cognitive engine (CE). Thereby, the sensing information is collected in the cognitive engine (CE).

In addition, the cognitive engine (CE) specifies a group (set) of spectrum sensors, on the basis of the collected sensing information.

In the first specific example, the auxiliary control channel for sensing (ACS) is used in communication among the spectrum sensors or communication between the spectrum sensor and the cognitive engine (CE).

In the second specific example, the spectrum sensors 40 and 40a are configured to perform the cooperative sensing/collaborative sensing. The spectrum sensor 40 or the spectrum sensor 40a performs the spectrum sensing according to a request (instruction) from the cognitive engine (CE) or regularly and transmits the sensing result as the sensing information to the data archive 50. Thereby, the sensing information is collected in the data archive 50. Then, if the sensing information is transmitted to the data archive 50, the data archive 50 stores the sensing information. As a result, the intermittently transmitted sensing information is sequentially stored in the data archive 50.

The sensing information that is stored in the data archive 50 is used for monitoring the spectrum.

In the second specific example, the auxiliary control channel for sensing (ACS) is used in communication among the spectrum sensors or communication between the spectrum sensor and the data archive 50.

In the third specific example, each radio communication device is configured to perform the cooperative sensing/collaborative sensing. Each radio communication device specifies the collaborative radio communication device according to a request from the other radio communication devices and requests the specified radio communication device to transmit specific sensing information related to a specific frequency band (one or more kinds of frequency bands) that can be used between the specified radio communication device and each radio communication device. The request preferably includes the spectrum use association information. Examples of the spectrum use association information include information related to the frequency band, information related to a central frequency, information related to an occupation situation of the frequency band, and information related to sensing performance (the probability of false alarm and the probability of erroneous detection). Thereby, each radio communication device can previously collect the spectrum use association information that is needed when the following data communication is performed.

In the third specific example, the auxiliary control channel for sensing (ACS) is used in communication among the cognitive radio communication devices.

As described in detail above, according to the aspect, during a preparation period before the communication link is established, the common channel that can be used in the information exchange is detected, and the detected channel is used as the auxiliary control channel, so that the sensing information or the sensing control information can be quickly shared by the radio communication devices. Thereby, the communication link can be quickly established. That is, according to the aspect, the information sharing method that can efficiently and effectively exchange the sensing information or the sensing control information can be provided. Since the sharing channels are used, the existing protocol or specification can be used.

According to the aspect, when the radio communication device is the spectrum sensor, the auxiliary control channel can be used to transmit the sensing information from the spectrum sensor. Thereby, the other radio communication device can also share the sensing information. As a result, in the radio communication system 100, the sensing capability is enhanced. By performing the information exchange at the short distance using the auxiliary control channel for sensing (ACS), reliability of the sensing can be improved and the spectrum sensing with robustness can be realized. The plurality of spectrum sensors are preferably distributed spatially in the radio communication system 100. Thereby, multi-path fading can be decreased and the reliability can be improved.

According to the aspect, the auxiliary control channel also can be used to receive the sensing control information from the other radio communication devices or receive the sensing information from the spectrum sensors. Thereby, the sensing information from the other radio communication devices or the sensing information from the spectrum sensors can be collected. This is effective in particular when the radio communication device is the client of the spectrum sensor.

According to the aspect, when the radio communication device is the data archive, the plurality of information (sensing information or sensing control information) from the other radio communication devices and time information are stored together in the data archive. Therefore, the series of information stored in the data archive is read so that the series of information can be monitored. The complete information can be quickly acquired from the data archive.

The frequency band of the auxiliary control channel according to the aspect is the frequency slot that is selected from the ISM band. In particular, in the frequency band of the auxiliary control channel, the frequency slot that is selected from a 2.4 GHz band (2.4 to 2.5 GHz) is preferably used. In the 2.4 GHz band, since the frequency slot is used for the radio LAN, the radio PAN, or the short-distance communication, the auxiliary control channel can be easily detected.

According to the aspect, in addition to the information sharing method in the cognitive radio communication, the cognitive radio communication device and the cognitive radio communication system that can execute the information sharing method can be provided.

In the aspect, the radio communication device may be a part of a device that can perform the radio communication or the device itself. The plurality of radio communication devices may include the data archive.

At least a part of the contents of the present invention is expected to be announced as a paper titled "Auxiliary Control Channel For Spectrum Sensing in Cognitive Radio Systems" by the inventor at the IEICE SR workshop held in Tokyo on Jul. 29, 2009.

INDUSTRIAL APPLICABILITY

The present invention is suitable for a field of the radio communication, and particularly for the cognitive radio communication.

DESCRIPTION OF REFERENCE SIGNS

1 radio network
3 Internet backbone
10, 15, 15' base station
20, 30, 31 radio communication device
30a cognitive engine (CE)
40, 40a spectrum sensor
41 communication module
42 transceiver
43 radio communication module controller
45 sensing module
46 detector
46a RF chain
46b analog/digital converter (A/D converter)
47 sensing information processing unit
48 memory
49 power supply unit
50 data archive
60 channel
65, 65a to 65e auxiliary control channel for sensing (ACS)
100 cognitive radio communication system

The invention claimed is:

1. An information sharing method in cognitive radio communication, comprising:
a detecting step of detecting an auxiliary control channel for sensing which is a common channel used among a plurality of radio communication devices, during a sensing period and before a communication link for the cognitive radio communication is established;
an information sharing step of causing sensing information and sensing control information to be shared by the plurality of radio communication devices, using the auxiliary control channel for sensing detected in the detecting step; and
a determining step of determining a pair of radio communication devices to perform data communications and frequency bands to perform the data communications by the pair of radio communication devices, based on the sensing information;
wherein the plurality of radio communication devices include a spectrum sensor at performs spectrum sensing before the communication link is established,
the information sharing method further comprises a sensing step of obtaining the sensing information in such a manner that the spectrum sensor performs the spectrum sensing, wherein the auxiliary control channel for sensing is detected by the spectrum sensing executed by the spectrum sensor,
in the information sharing step, the spectrum sensor transmits the sensing information obtained by the sensing step to the other radio communication devices using the auxiliary control channel for sensing which is the common channel so that the sensing information is shared by the plurality of radio communication devices, and
after the sensing period, the pair of radio communication devices that are determined in the determining step establish communication link using the frequency bands determined in the determining step.

2. The information sharing method according to claim 1, wherein the plurality of radio communication devices include a cognitive engine that generates the sensing control information used to control sensing of the spectrum sensor or a data archive configured to store the generated sensing control information and sensing information and provides the sensing control information and the sensing information to the other radio communication devices, and
in the sensing step, the spectrum sensor performs the spectrum sensing, according to the sensing control information acquired through the auxiliary control channel for sensing which is the common channel.

3. The information sharing method according to clam 1,
wherein the plurality of radio communication devices include a data archive configured to store information and
a cognitive engine configured to read the information stored in the data archive, and
in the information sharing step, the spectrum sensor transmits the sensing information obtained by the sensing step to the data archive using the auxiliary control channel for sensing which is the common channel so as to store the sensing information in the data archive so that the cognitive engine monitors the sensing information stored in the data archive.

4. The information sharing method according to claim 1,
wherein, in the detecting step, the auxiliary control channel for sensing which is the common channel is detected from a frequency slot of an ISM band.

5. A cognitive radio communication device comprising:
a means for causing information to be shared by other radio communication devices, in a sensing period which is before a communication link for the cognitive radio communication is established, using an auxiliary control channel for sensing which is common channel to share sensing information and sensing control information detected before a communication link for cognitive radio communication is established among radio communication devices, the means for causing information to be shared comprising a spectrum sensor that performs spectrum sensing before the communication link is established,
wherein the sensing information is obtained in such a manner that the spectrum sensor performs the spectrum sensing, and wherein the auxiliary control channel for sensing is detected by the spectrum sensing executed by the spectrum sensor, and
wherein the means for causing information to be shared transmits the sensing information obtained by the sensing step to the other radio communication devices using the auxiliary control channel for sensing which is the common channel so that the sensing information is shared by the other radio communication devices.

6. The cognitive radio communication device of claim 5, further comprising:
a cognitive engine that generates the sensing control information used to control sensing of the spectrum sensor or a data archive configured to store the generated sensing control information and sensing information and provides the sensing control information and the sensing information to the other radio communication devices,
wherein the spectrum sensor performs the spectrum sensing, according to the sensing control information acquired through the auxiliary control channel for sensing which is the common channel.

7. The cognitive radio communication device of claim 5, further comprising:
a data archive configured to store information and
a cognitive engine configured to read the information stored in the data archive, and
wherein the spectrum sensor transmits the sensing information to the data archive using the auxiliary control channel for sensing which is the common channel so as to store the sensing information in the data archive so that the cognitive engine monitors the sensing information stored in the data archive.

8. A cognitive radio communication system that includes a plurality of radio communication devices, comprising:
a means for causing information to be shared by other radio communication devices, in a sensing period which is before a communication link for the cognitive radio communication is established, using an auxiliary control channel for sensing which is common channel to share sensing information and sensing control information detected before a communication link for cognitive radio communication is established among radio communication devices the means for causing information to be shared comprising a spectrum sensor that performs spectrum sensing before the communication link is established;
a means for transmitting and receiving the sensing information using the auxiliary control channel for sensing; and
a means for determining a pair of radio communication devices to perform data communications and frequency bands to perform the data communications by the pair of radio communication devices, based on the sensing information,
wherein the sensing information is obtained in such a manner that the spectrum sensor performs the spectrum sensing and wherein the auxiliary control channel for sensing is detected by the spectrum sensing executed by the spectrum sensor, and
wherein the means for causing information to be shared transmits the sensing information obtained by the sensing step to the other radio communication devices using the auxiliary control channel for sensing which is the common channel so that the sensing information is shared by the other radio communication devices.

9. The cognitive radio communication system of claim 8, further comprising:
a cognitive engine that generates the sensing control information used to control sensing of the spectrum sensor or a data archive configured to store the generated sensing control information and sensing information and provides the sensing control information and the sensing information to the other radio communication devices,
wherein the spectrum sensor performs the spectrum sensing, according to the sensing control information acquired through the auxiliary control channel for sensing which is the common channel.

10. The cognitive radio communication system of claim 8, further comprising:
a data archive configured to store information and
a cognitive engine configured to read the information stored in the data archive, and
wherein the spectrum sensor transmits the sensing information to the data archive using the auxiliary control channel for sensing which is the common channel so as to store the sensing information in the data archive so that the cognitive engine monitors the sensing information stored in the data archive.

\* \* \* \* \*